US011753230B2

(12) United States Patent
Lee et al.

(10) Patent No.: US 11,753,230 B2
(45) Date of Patent: Sep. 12, 2023

(54) BATTERY PACK PACKAGING BOX, AND BATTERY PACK STORED IN SAME (71) Applicant: LG ENERGY SOLUTION, LTD., Seoul (KR)

(72) Inventors: Jun Houng Lee, Daejeon (KR); Jae Sun Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/772,410

(22) PCT Filed: Jul. 30, 2021

(86) PCT No.: PCT/KR2021/009960
§ 371 (c)(1),
(2) Date: Apr. 27, 2022

(87) PCT Pub. No.: WO2022/065667
PCT Pub. Date: Mar. 31, 2022

(65) Prior Publication Data
US 2022/0380108 A1  Dec. 1, 2022

(30) Foreign Application Priority Data

Sep. 28, 2020  (KR) .................. 10-2020-0125779

(51) Int. Cl.
*B65D 81/113* (2006.01)
*B65D 85/68* (2006.01)

(52) U.S. Cl.
CPC ............ *B65D 81/113* (2013.01); *B65D 85/68* (2013.01); *B65D 2585/88* (2013.01)

(58) Field of Classification Search
CPC ........ B65D 5/50; B65D 81/02; B65D 81/113; B65D 85/68; B65D 2585/88; H01J 11/20; H01J 11/46; H01M 2/10; H01M 50/20
USPC ................ 206/521, 523, 591, 592, 594, 703
See application file for complete search history.

(56) References Cited

U.S. PATENT DOCUMENTS

| 2006/0045562 | A1 | 3/2006 | Choi et al. |
| 2007/0051660 | A1 | 3/2007 | Lee et al. |
| 2008/0164401 | A1 | 7/2008 | Huang et al. |
| 2015/0295212 | A1 | 10/2015 | Hwangbo |
| 2020/0381683 | A1* | 12/2020 | Shimizu ................ H01M 50/24 |

FOREIGN PATENT DOCUMENTS

| CN | 103072762 A | 5/2013 |
| CN | 103112659 A | 5/2013 |
| CN | 103359396 A | 10/2013 |

(Continued)

OTHER PUBLICATIONS

Extended European Search Report for European Application No. 21872700.6, dated Jun. 7, 2023.

(Continued)

*Primary Examiner* — Bryon P Gehman
(74) *Attorney, Agent, or Firm* — Birch, Stewart, Kolasch & Birch, LLP (57) ABSTRACT A battery pack packing box capable of easily fixing a battery pack in a lower case by using a buffering member including an insertion hole into which the upper portion of the battery pack is inserted is provided. The buffering member includes a frame and a plurality of wing-shaped ribs.

11 Claims, 9 Drawing Sheets (56) References Cited

FOREIGN PATENT DOCUMENTS

| | | | |
|---|---|---|---|
| CN | 106553819 A | | 4/2017 |
| CN | 210102477 U | * | 2/2020 |
| DE | 25 45 762 A | | 4/1977 |
| EP | 1 650 685 A1 | | 4/2006 |
| FR | 2 280 301 A7 | | 2/1976 |
| GB | 1 476 002 | | 6/1977 |
| JP | 6-46061 Y2 | | 11/1994 |
| JP | 2924901 B1 | | 7/1999 |
| JP | 2004-352315 A | | 12/2004 |
| JP | 65200280 B2 | | 6/2013 |
| JP | 2014-19498 A | | 2/2014 |
| JP | 2020-117276 A | | 8/2020 |
| KR | 1998-018859 U | | 7/1998 |
| KR | 10-2000-0014391 A | | 3/2000 |
| KR | 20-0345043 Y1 | | 3/2004 |
| KR | 10-2006-0019456 A | | 3/2006 |
| KR | 10-2007-0025509 A | | 3/2007 |
| KR | 10-2012-0012045 A | | 2/2012 |
| KR | 10-2015-0061843 A | | 6/2015 |
| KR | 10-2015-0118473 A | | 10/2015 |
| KR | 10-1705788 B1 | | 2/2017 |
| KR | 10-2224026 B1 | | 3/2021 |

OTHER PUBLICATIONS

International Search Report for PCT/KR2021/009960 dated Nov. 2, 2021.

* cited by examiner

BATTERY PACK PACKAGING BOX, AND BATTERY PACK STORED IN SAME

TECHNICAL FIELD

This application claims the benefit of priority based on Korean Patent Application No. 10-2020-0125779, filed on Sep. 28, 2020, and the entire contents of the Korean patent application are incorporated herein by reference.

The present invention relates to a battery pack packing box and a battery pack accommodated therein.

BACKGROUND ART

Secondary batteries, which can be easily applied to various groups of products and have electric characteristics such as a high energy density, are currently widely applied to electric vehicles (EV), hybrid electric vehicles (HEV), etc. as well as mobile devices. Such secondary batteries are attracting attention as an environmentally friendly energy source for energy efficiency in that the use of fossil fuels can be significantly reduced, and the by-product according to the use of energy is not generated at all.

Currently widely used secondary batteries include a lithium ion battery, a lithium polymer battery, a nickel-cadmium battery, a nickel hydrogen battery, a nickel zinc battery. The operating voltage of this unit secondary battery cell, that is, the unit battery cell, is about 2.5V to 4.5V. Therefore, when the higher output voltage is required, a plurality of battery cells may be connected in series to prepare a battery pack. Further, depending on the charge/discharge capacity required for the battery pack, a plurality of battery cells may be connected in parallel to prepare a battery pack. Thus, the number of battery cells included in the battery pack may be variously set according to the required output voltage or charge/discharge capacity.

On the other hand, when a battery pack is prepared by connecting a plurality of battery cells in series/parallel, generally, a battery module including at least one battery cell is first formed, and other elements are then added using at least one battery module to thereby prepare a battery pack.

Conventional battery packs have recently been used as energy sources for electric vehicles, etc., and as the demand for high-capacity electric vehicles increases, more battery cells tend to be included to secure a high capacity.

Since automobile companies try to increase the amount of battery packs to be placed in the surplus space during parts designing of a vehicle, the shape of the battery may be differently designed according to each vehicle and automobile company. Accordingly, battery packs for electric vehicles are currently designed and produced in various shapes.

In particular, such a high-volume battery pack is a dangerous article designated in the United Nations, so safe handling is required. Further, the high capacity battery pack should be designed in a manner that minimizes the movement during the transportation or handling by fixing the battery pack at a packing box, etc.

Conventionally, in order to pack the high capacity battery pack, the battery pack was fixed directly with a belt, or a partition wall was built with a corrugated cardboard to fix the battery pack. However, when the battery pack was fixed by a belt, the external appearance of the battery pack was damaged by the friction between the fastening portion of the belt and the battery pack. In addition, when fixing the battery pack with a corrugated cardboard, the battery pack fell down due to the lack of fixation power in a humid environment.

Therefore, it is necessary to develop a battery pack packing box capable of effectively fixing a battery pack of high capacity.

DISCLOSURE

Technical Problem

In order to solve the problems of the prior art, an object of the present invention is to provide a battery pack packing box capable of effectively fixing and accommodating a battery pack of a high capacity, and a battery pack accommodated therein.

Technical Solution

The present invention is believed to solve at least some of the above problems. For example, an aspect of the present invention provides a battery pack packing box. In one example, a battery pack packing box according to the present invention includes: a lower case having one open surface to accommodate a battery pack therein; a buffering member to fix the battery pack accommodated in the lower case, the buffering member having an insertion hole into which an upper portion of the battery pack is inserted; and a cover to cover the one surface of the lower case. At this time, the buffering member includes: a frame to cover a circumference of the battery pack; and n (n is an integer equal to or greater than 2) wing-shaped ribs protruding away from the frame to support an inside of the lower case.

The buffering member is made of one of more selected from the group consisting of foam polystyrene (EPS), foam polypropylene (EPP) and foam polyethylene (EPE).

In one example, the buffering member fixes the upper portion of the battery pack accommodated in the lower case and is positioned in a region corresponding to 30% on average from an upper end of the lower case.

The buffering member is symmetrical on a basis of an axis of the battery pack inserted into the insertion hole. In a specific example, the ribs of the buffering member have a hollow structure, and have a skeleton unit which supports a load of the battery pack in the hollow structure. Further, the skeleton unit includes a first skeleton part oriented in a first direction; and a second skeleton part oriented in a second direction perpendicular to the first skeleton part.

In one example, the first and second skeleton parts are formed on one or two surfaces of the ribs and are formed to be perpendicular to a contact surface of the inside of the lower case.

Further, the frame includes the insertion hole, into which the upper portion of the battery pack is inserted, in a central region, and an inner circumference of the insertion hole corresponds to the circumference of the battery pack.

Further, the lower case further includes a seating member including a bottom surface on which the battery pack is seated. In a specific example, a lower surface of the seating member has a flat structure, and an upper surface of the seating member has a notched structure to correspond to a lower shape of the battery pack.

Further, the seating member further includes a fixing member for fixing the battery pack.

Further, the present invention provides a battery pack accommodated in the above-described battery pack packing box.

Advantageous Effects

The battery pack packing box according to the present invention can easily fix the battery pack in the lower case using a buffering member including an insertion hole into which the upper portion of the battery pack is inserted.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail.

The present invention relates to a battery pack packing box and a battery pack accommodated therein.

As described above, conventionally, in order to pack a high capacity battery pack, the battery pack was fixed with a belt, or a partition wall was built with a member made of a corrugated cardboard, etc. to fix the battery pack. However, when the battery pack was fixed by a belt, the external appearance of the battery pack was damaged by the friction between the fastening portion of the belt and the battery pack. In addition, when fixing the battery pack with a corrugated cardboard, the battery pack fell down due to the lack of fixation power in a humid environment.

As such, the inventors of the present invention have devised a battery pack packing box including a buffering member having an insertion hole into which the upper portion of a battery pack is inserted. Specifically, the present invention provides a battery pack packing box including a buffering member capable of preventing the movement of a battery pack during the transportation or handling of the battery pack by fixing the battery pack by inserting the upper portion of the battery pack into an insertion hole, and increasing the friction between the friction force with the inner surface of the lower case, and a battery pack accommodated in the battery pack packing box.

Hereinafter, a battery pack packing box and a battery pack accommodated therein according to the present invention will be described in detail.

In one example, a battery pack packing box according to the present invention includes: a lower case which has one open surface and accommodates a battery pack therein; a buffering member which fixes the battery pack accommodated in the lower case and has an insertion hole into which an upper portion of the battery pack is inserted; and a cover which covers one surface of the lower case. At this time, the buffering member includes: a frame which covers a circumference of the battery pack; and n (n is an integer equal to or greater than 2) wing-shaped ribs which protrude in an external direction of the frame and support an inside of the lower case.

The lower case has a quadrilateral box form having an open top, and the buffering member may be disposed to fix the upper portion of the battery pack accommodated in the lower case and support the side surface in the lower case. On the other hand, the lower case is preferably a member capable of accommodating a high weight battery pack. For example, the lower case may be a wood pallet or a hard board having a predetermined thickness.

The buffering member is used to fix the battery pack inside the battery pack packing box and mitigate a shock to the battery pack. The buffer member may be formed of a resin foam or the like. Specifically, the buffering member is made of one of more selected from group consisting of foam polystyrene (EPS), foam polypropylene (EPP) and foam polyethylene (EPE). For example, the buffering member may be formed of foam polystyrene (EPS).

In one example, the buffering member according to the present invention fixes the upper portion of the battery pack accommodated in the lower case and is positioned in a region corresponding to 30% on average from an upper end of the lower case. Particularly, the buffering member can suppress the movement of the battery pack during transportation of handling of the battery pack by fixing only the upper portion of the battery pack by fixing the battery pack and at the same time, supporting the inside of the lower case. Namely, the battery pack packing box according to the present invention can suppress the movement of the battery pack during transportation or handling of the battery pack without including a buffering member in the entire region of the inside of the lower case. Accordingly, the present invention can reduce costs.

In one embodiment, the buffering member includes a frame and ribs. Specifically, the buffering member includes a frame having an insertion hole in the central region and n ribs (n is an integer equal to or greater than 2) protruding in an outward direction of the frame. For example, the ribs may have a structure in which 6 ribs protrude in an outward direction of the frame in a winged shape. However, the present invention is not limited thereto.

In a specific example, the frame has an insertion hole, into which an upper portion of a battery pack is inserted, in the central region as described above. At this time, the inner circumference of the insertion hole may correspond to the circumference of the battery pack. As such, the battery pack can be stably fixed in the lower case. Further, the ribs of the buffering member have a winged structure in which 6 ribs protrude in the outward direction of the frame, and the end portions of the ribs support the inside of the lower case. In particular, the ribs can effectively fix the battery pack by the frictional force with the region contacting the inside of the lower case.

In one embodiment, the buffering member has a structure which is symmetrical on a basis of an axis of the battery pack inserted into the insertion hole. Namely, the buffering member has a symmetrical structure on a basis of an axis of the insertion hole. Accordingly, the buffering member may disperse the load of the battery pack, which is inserted into the insertion hole, to thereby effectively fix the battery pack and easily prevent the movement of the battery pack during the transportation or handling of the battery pack.

In another example, the buffering member of the battery pack packing box according to the present invention may have a hollow structure therein. The hollow structure means a structure in which a groove has been cut in a predetermined region of ribs.

In addition, the ribs may have a structure in which a skeleton unit supporting the load of the battery pack is formed inside the hollow structure. In a specific example, the skeleton unit may include a first skeleton part oriented in a first direction, and a second skeleton part oriented in a direction perpendicular to the first skeleton part. For example, the first and second skeleton parts may be formed on the upper surface of the ribs and may be formed in a direction perpendicular to the contact surface of the inside of the lower case. Namely, the ribs may include first and second skeleton parts to thereby easily support the load of the battery pack fixed on the buffering member.

In further another example, the battery pack packing box according to the present invention further includes a seating member. The seating member is used to allow the battery pack, accommodated in the battery pack packing box, to be easily seated.

In a specific example, the lower surface of the seating member has a flat structure, and the upper surface of the seating member has a notched structure to correspond to a lower shape of the battery pack. Namely, the upper surface of the seating member has a groove corresponding to the shape of the lower portion of the battery pack. In particular, the battery pack, which is accommodated in a battery pack packing box, is safely seated in a notched structure of a seating member, to thereby easily prevent the movement of the battery pack during the transportation or handling of the battery pack.

Further, the seating member further includes a fixing member for fixing the battery pack. There is no limitation to the shape of the fixing member as long as it can fix the battery pack. The fixing member may be a conventional belt or a screw.

The battery pack packing box according to the present invention can easily prevent the movement of the battery pack during the transportation or handling of the battery pack by safely seating the lower portion of the battery pack on a seating member and fixing the upper portion of the battery pack by using a buffering member.

Further, the present invention provides a battery pack accommodated in the above-described battery pack packing box. In one example, the battery pack packing box and a battery pack accommodated in the battery pack packing box are provided.

The above-mentioned battery pack may be applied to any case where a plurality of battery cells are collected in a wide sense. For example, it may mean a battery module as well as a battery pack. For example, the battery pack may be applied to a vehicle power source or a large capacity power storage device.

Hereinafter, various forms of the battery pack packing box according to the present invention will be described in detail.

First Embodiment

Figure 1:
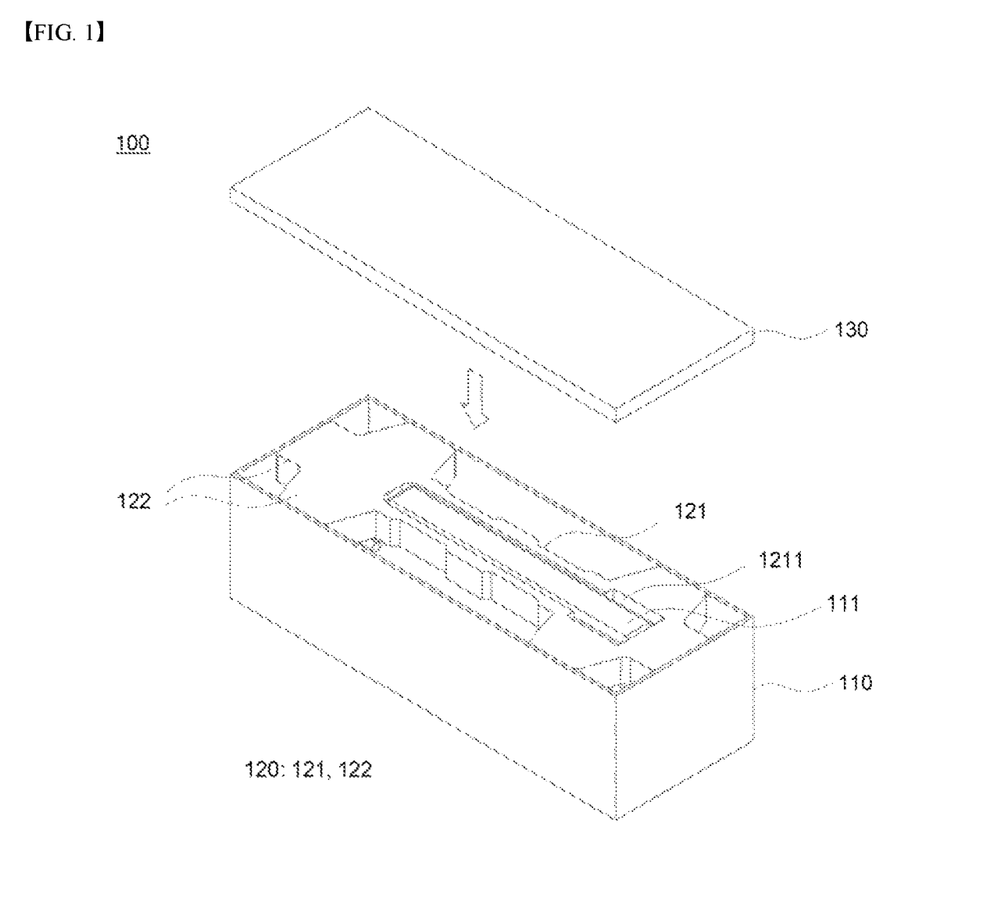
FIG. 1 is a schematic diagram of a battery pack packing box according to one embodiment of the present invention.

FIG. 1 is a schematic diagram of a battery pack packing box according to one embodiment of the present invention. Referring to FIG. 1, a battery pack packing box 100 according to the present invention includes: a lower case 110 which has one open surface and accommodates a battery pack 111 therein; a buffering member 120 which fixes the battery pack 111 accommodated in the lower case 110 and has an insertion hole 1211 into which an upper portion of the battery pack 111 is inserted; and a cover 130 which covers one surface of the lower case 110.

The lower case 110 has a quadrilateral box form having an open top, and the buffering member 120 is disposed to fix the upper portion of the battery pack 111 accommodated in the lower case 110 and support the side surface in the lower case 110.

Particularly, the buffering member 120 has an insertion hole 1211 in the central region, and the upper portion of the battery pack 111, which is accommodated in the lower case 110, is inserted into the insertion hole 1211. Specifically, the buffering member 120 fixes the upper portion of the battery pack 111 accommodated in the lower case 110 and is positioned in a region corresponding to 30% on average from an upper end of the lower case 110. Namely, the buffering member 120 can suppress the movement of the battery pack 111 during the transportation or handling of the battery pack 111 by fixing only the upper portion of the battery pack.

Figure 2:
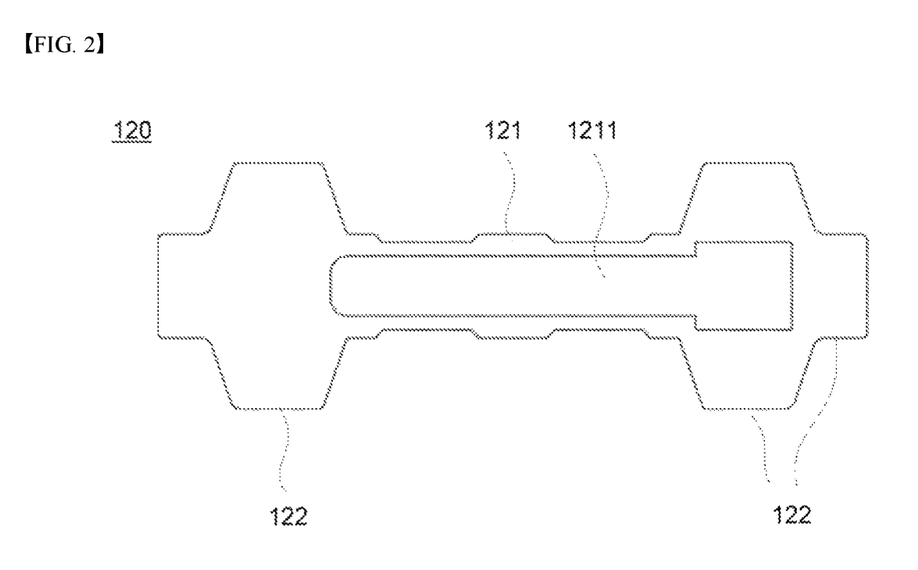
FIG. 2 is a schematic diagram of a buffering member that fixes the battery pack inside the battery pack packing box according to one embodiment of the present invention.

FIG. 2 is a schematic diagram of a buffering member that fixes the battery pack inside the battery pack packing box according to one embodiment of the present invention. Referring to FIG. 2, a buffering member 120 includes a frame 121 and ribs 122. Specifically, the buffering member 120 includes a frame 121 having an insertion hole 1211 in the central region and n ribs 122 (n is an integer equal to or greater than 2) protruding in an outward direction of the frame 121. FIG. 2 illustrates 6 ribs 122 protruding in an outward direction of the frame 121, but the present invention is not limited to this example.

In particular, the frame 121 has an insertion hole 1211, into which an upper portion of a battery pack is inserted, in the central region as described above. At this time, the inner circumference of the insertion hole 1211 may correspond to the circumference of the battery pack.

Further, the ribs 122 have a winged structure in which 6 ribs protrude in the outward direction of the frame 121, and the end portions of the ribs 122 support the inside of the lower case. In particular, the ribs can effectively fix the battery pack by the frictional force with the region contacting the inside of the lower case.

Further, the buffering member has a structure which is symmetrical on a basis of an axis of the battery pack inserted into the insertion hole 1211. Namely, the buffering member 120 has a symmetrical structure on a basis of an axis of the insertion hole 1211. Accordingly, the buffering member 120 may disperse the load of the battery pack, which is inserted into the insertion hole 1211, to thereby effectively fix the battery pack and easily prevent the movement of the battery pack during the transportation or handling of the battery pack.

Second Embodiment

Figure 3:
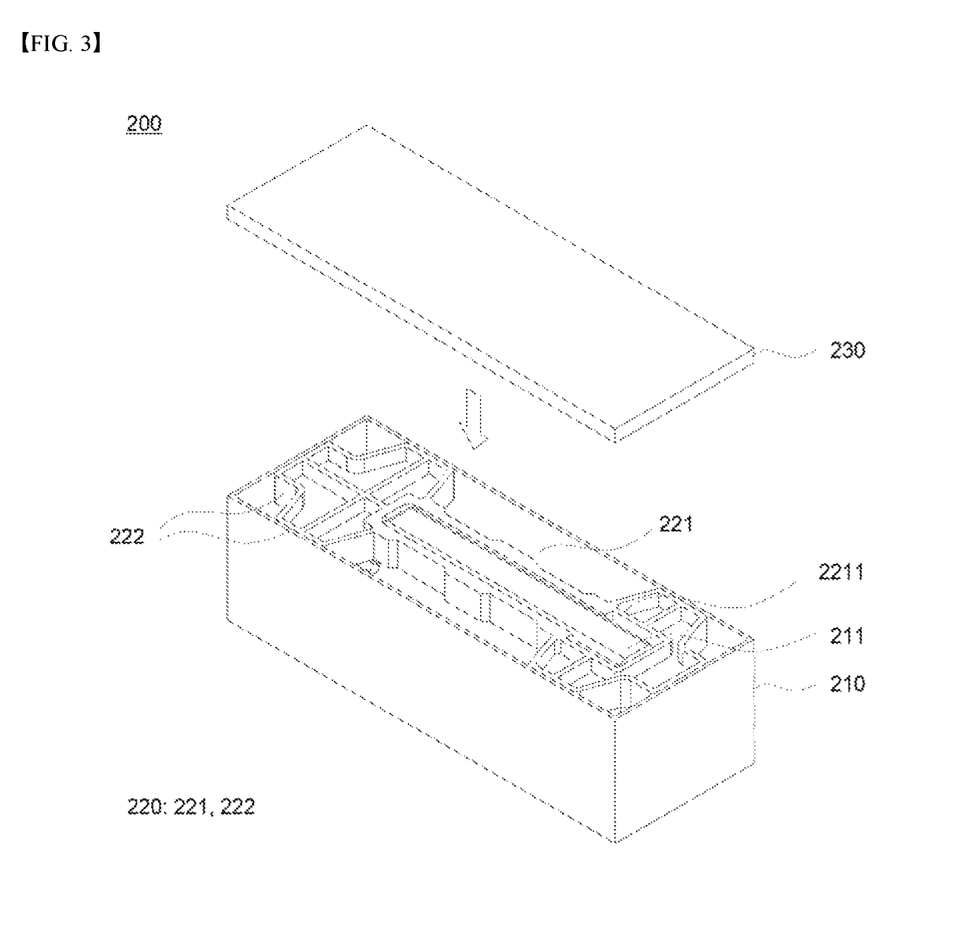
FIG. 3 is a schematic diagram of a battery pack packing box according to another embodiment of the present invention.

FIG. 3 is a schematic diagram of a battery pack packing box according to another embodiment of the present invention. Referring to FIG. 3, a battery pack packing box 200 according to the present invention includes: a lower case 210 which has one open surface and accommodates a battery pack 211 therein; a buffering member 220 which fixes the battery pack 211 accommodated in the lower case 210 and has an insertion hole 2211 into which an upper portion of the battery pack 211 is inserted; and a cover 230 which covers one surface of the lower case 210.

Further, a buffering member 220 includes a frame 221 and ribs 222. Specifically, the buffering member 220 includes a frame 221 having an insertion hole 2211 in the central region and n ribs 222 (n is an integer equal to or greater than 2) protruding in an outward direction of the frame 221. FIG. 3 illustrates 6 ribs 222 protruding in an outward direction of the frame 221, but the present invention is not limited to this example.

Figure 4:
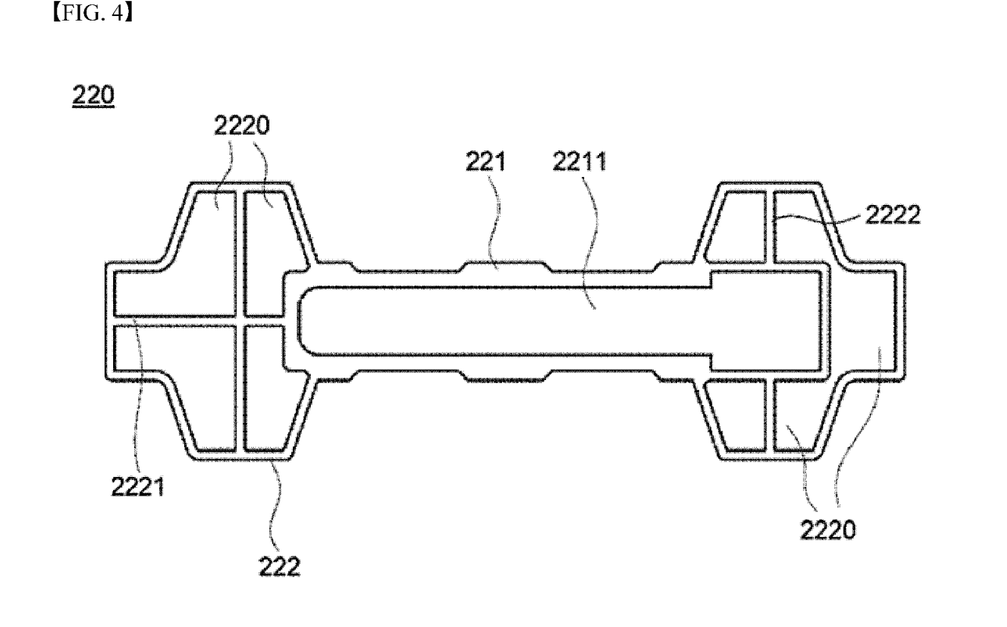
FIG. 4 is a schematic diagram of a buffering member that fixes the battery pack inside the battery pack packing box according to another embodiment of the present invention.

FIG. 4 is a schematic diagram of a buffering member that fixes the battery pack inside the battery pack packing box according to another embodiment of the present invention. Referring to FIG. 4, the ribs 222 of the buffering member 220 have a hollow structure 2220 inside. The hollow structure 2220 means a structure in which a groove has been cut in a predetermined region of ribs 222.

Further, the ribs 222 have skeleton units 2221 and 2222, which support the load of the battery pack, in a hollow structure 2220. Specifically, the skeleton unit includes a first skeleton part 2221 oriented in a first direction, and a second skeleton part 2222 oriented in a direction perpendicular to the first skeleton part 2221.

Specifically, the first and second skeleton parts 2221 and 2222 are formed on the upper surface of the ribs 222 and are formed in a direction perpendicular to the contact surface of the inside of the lower case. Namely, the ribs 222 can easily support the load of the battery pack fixed on the buffering member 220 by including the first and second skeleton parts 2221 and 2222.

Third Embodiment

Figure 5:
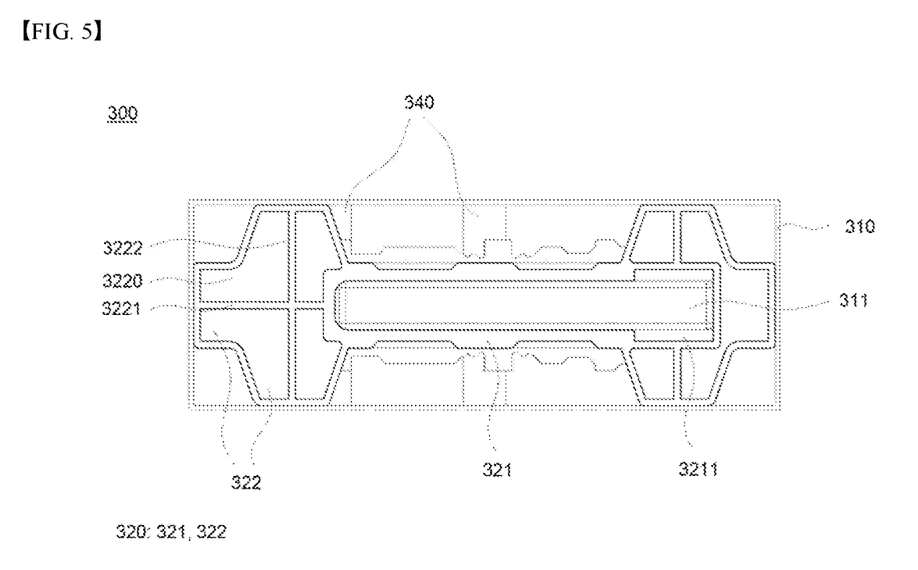
FIG. 5 is a schematic diagram of a battery pack packing box according to another embodiment of the present invention.

FIG. 5 is a schematic diagram of a battery pack packing box according to another embodiment of the present invention. Referring to FIG. 5, a battery pack packing box 300 according to the present invention includes: a lower case 310 which has one open surface and accommodates a battery pack 311 therein; a buffering member 320 which fixes the battery pack 311 accommodated in the lower case 310 and has an insertion hole 3211 into which an upper portion of the battery pack 311 is inserted; and a cover (not shown) which covers one surface of the lower case 310.

Further, a buffering member 320 includes a frame 321 and ribs 322. Specifically, the buffering member 320 includes a frame 321 having an insertion hole 3211 in the central region and n ribs 322 (n is an integer equal to or greater than 2) protruding in an outward direction of the frame 321. FIG. 5 illustrates 6 ribs 322 protruding in an outward direction of the frame 321, but the present invention is not limited to this example. Further, the ribs 322 of the buffering member 320 have a hollow structure 3220 therein, and skeleton units 3221 and 3222, which support the load of the battery pack, are formed in the hollow structure 3220. At this time, the skeleton unit includes a first skeleton part 3221 oriented in a first direction, and a second skeleton part 3222 oriented in a direction perpendicular to the first skeleton part 3221.

Further, the battery pack packing box 300 according to the present invention further includes a seating member 340. The seating member 340 is used to allow the battery pack 311, which is accommodated in the battery pack packing box 300, to be easily seated.

Figure 6:
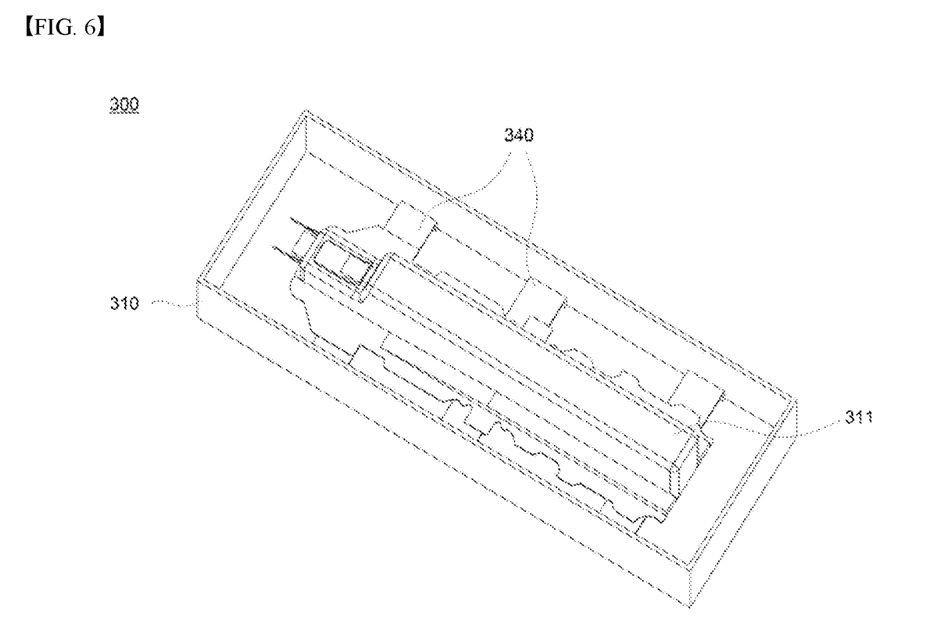
FIG. 6 is a schematic diagram showing a structure in which a battery pack is seated on the seating member of a battery pack packing box according to another embodiment of the present invention.

FIG. 6 is a schematic diagram showing a structure in which a battery pack is seated on the seating member of a battery pack packing box according to another embodiment of the present invention. Referring to FIG. 6, the battery pack packing box 300 according to the present invention further includes a seating member 340. The seating member 340 is used to allow the battery pack 311, which is accommodated in the battery pack packing box 300, to be easily seated. Specifically, in the seating member 340, the lower surface contacting the bottom surface of the lower case 310 has a flat structure, and the upper surface contacting the battery pack 311 has a notched structure (not shown) corresponding to the lower shape of the battery pack 311. Namely, the upper surface of the seating member 340 has a groove corresponding to the shape of the lower portion of the battery pack 311. In particular, the battery pack 311 accommodated in the battery pack packing box 300 is safely seated on the notched structure of the seating member 340, thereby easily preventing the movement of the battery pack 311 during the transportation or handling of the battery pack 311.

Further, the seating member 340 further includes a fixing member (not shown) for fixing the battery pack 311. There is no limitation to the shape of the fixing member as long as it can fix the battery pack 311.

The battery pack packing box 300 according to the present invention can easily prevent the movement of the battery pack 311 during the transportation or handling of the battery pack 311 by allowing the lower portion of the battery pack 311 to be safely seated on the seating member 340 and fixing the upper portion of the battery pack 311 at the buffering member 320.

Fourth Embodiment

Figure 7:
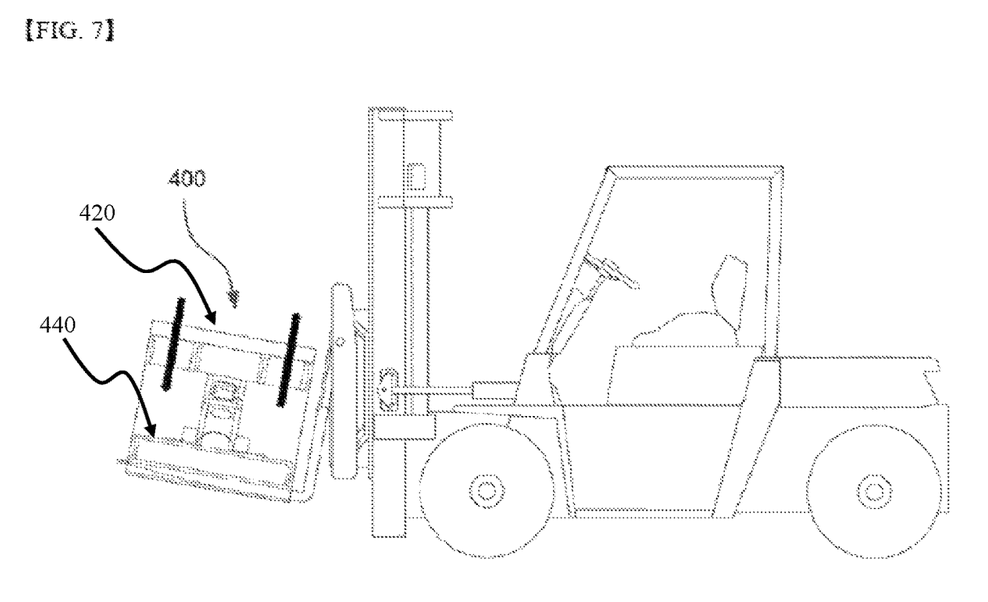
FIG. 7 is a diagram schematically showing a test process when a careless handling test was performed using a battery pack packing box of the present invention.

FIG. 7 is a diagram schematically showing a test process when a careless handling test was performed using a battery pack packing box of the present invention. A battery pack was accommodated in a battery pack packing box 400 according to the present invention, and a careless handling test was performed for the battery pack packing box using a forklift. Specifically, the battery pack packing box was lifted by a forklift, and was then moved by a predetermined distance. Further, the forklift and the cargo are tilted to the driver while moved for the safety. At this time, the battery pack packing box comes to have a specific slope. The forklift moved by a predetermined distance at 20 km/h while maintaining the predetermined slope and passed irregularities while maintaining the speed to apply an impact to the battery pack and the battery pack packing box, and the battery pack packing box was then put down again.

Figure 8:
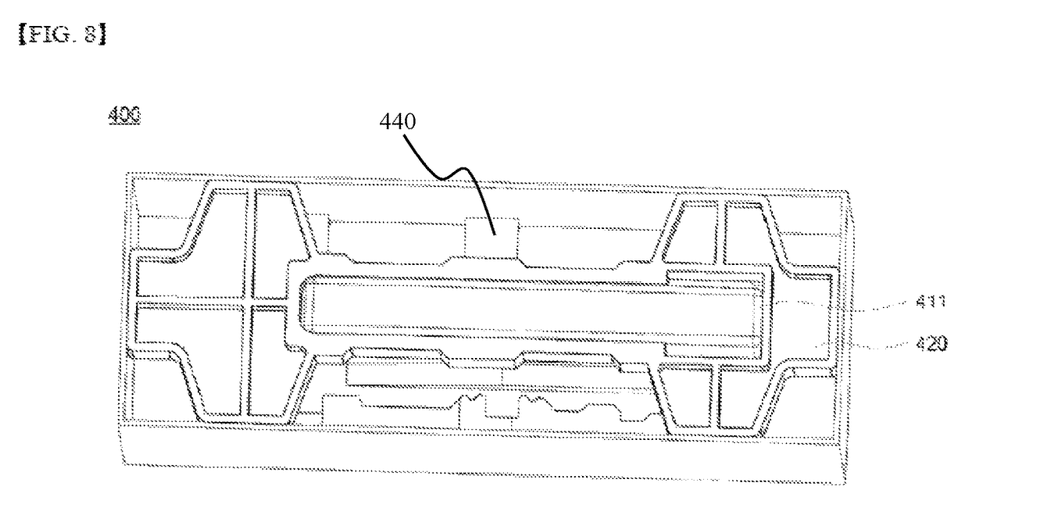
FIG. 8 is a diagram illustrating the inside of the lower case after the careless handling test of a battery pack packing box was performed.

Then, the state of the battery pack accommodated in the battery pack packing box 400 was checked. FIG. 8 is a diagram illustrating the inside of the lower case after the careless handling 10 test of a battery pack packing box 400 was performed. Referring to FIG. 8, after a careless handing test of a battery pack packing box 400 was performed, the battery pack 411 was safely seated on the seating member 440 without any damage to the buffering member 420.

Figure 9:
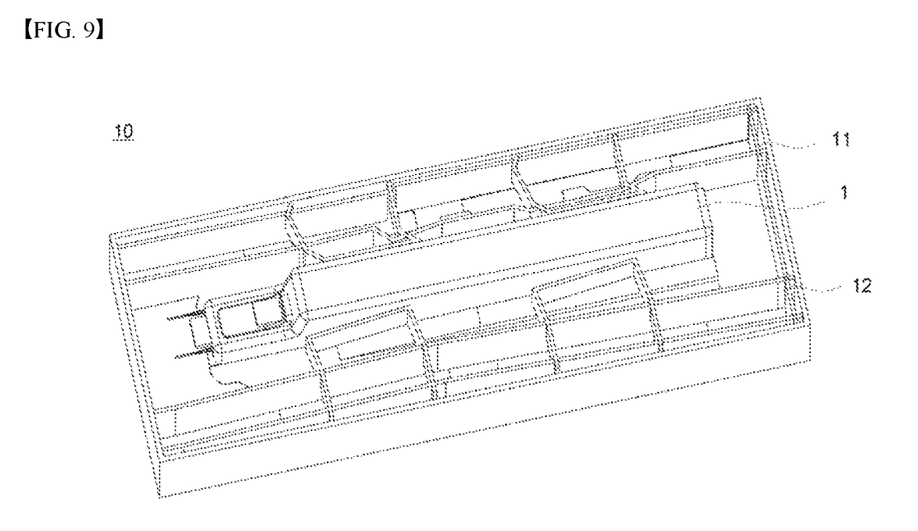
FIG. 9 is a diagram illustrating the inside of the lower case after the careless handling test of the conventional battery pack packing box was performed.

Further, a careless handing test was performed using the conventional battery pack packing box in the same manner as in the present invention. And the result is shown in FIG. 9. FIG. 9 is a diagram illustrating the inside of the lower case after the careless handling test of the conventional battery pack packing box was performed.

Referring to FIG. 9, in the case of the conventional battery pack packing box 10, the battery pack 1, which was accommodated in the battery pack packing box, was fixed by building a partition wall 11, 12 formed of a corrugated cardboard, but the partition wall was broken during the transportation of the battery pack packing box. In this case, the battery cell accommodated in the lower case may also be physically deformed.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

100, 200, 300, 400: battery pack packing box
110, 210, 310: lower case
1, 111, 211, 311, 411: battery pack
11, 12: partition wall
120, 220, 320, 420: buffering member
121, 221, 321: frame
1211, 2211, 3211: insertion hole
122, 222, 322: rib
2220, 3220: hollow structure
2221, 3221: first skeleton part
2222, 3222: second skeleton part
130, 230: cover
340: seating member

The invention claimed is:

1. A battery pack packing box comprising:
a lower case having one open surface to accommodate a battery pack therein and a bottom opposite the open surface;
a buffering member to fix the battery pack accommodated in the lower case, the buffering member being spaced from the bottom of the lower case, the buffering member having an insertion hole into which an upper portion of the battery pack is inserted; and
a cover to cover the one surface of the lower case; and
a seating member including a bottom surface configured to directly support the battery pack, the seating member being spaced apart from the buffering member,
wherein the buffering member includes:
a frame to cover a circumference of the battery pack; and
n wing-shaped ribs protruding away from the frame to support an inside of the lower case, and wherein n is an integer equal to or greater than 2.

2. The battery pack packing box of claim 1, wherein the buffering member comprises one of more selected from the group consisting of foam polystyrene (EPS), foam polypropylene (EPP) and foam polyethylene (EPE).

3. The battery pack packing box of claim 1, wherein the buffering member fixes the upper portion of the battery pack accommodated in the lower case, and
wherein the buffering member is positioned in a region corresponding to 30% on average of a height of the lower case from an upper end of the lower case.

4. The battery pack packing box of claim 1, wherein the buffering member is symmetrical on a basis of an axis of the battery pack inserted into the insertion hole.

5. The battery pack packing box of claim 1, wherein the ribs of the buffering member have a hollow structure, and have a skeleton unit which supports a load of the battery pack in the hollow structure, and
wherein the skeleton unit includes:
a first skeleton part oriented in a first direction; and
a second skeleton part oriented in a second direction perpendicular to the first skeleton part.

6. The battery pack packing box of claim 5, wherein the first and second skeleton parts are formed on one or two surfaces of the ribs and are formed to be perpendicular to a contact surface of the inside of the lower case.

7. The battery pack packing box of claim 1, wherein the frame includes the insertion hole, into which the upper portion of the battery pack is inserted, in a central region, and
wherein an inner circumference of the insertion hole corresponds to the circumference of the battery pack.

8. The battery pack packing box of claim 1 wherein a lower surface of the seating member has a flat structure, and
wherein an upper surface of the seating member has a notched structure to correspond to a lower shape of the battery pack.

9. The battery pack packing box of claim 1 wherein the seating member further includes a fixing member for fixing the battery pack.

10. A battery pack accommodated in the battery pack packing box according to claim 1.

11. A battery pack packing box comprising:
a lower case having one open surface to accommodate a battery pack therein and a bottom opposite the open surface;
a buffering member to fix the battery pack accommodated in the lower case, the buffering member being spaced from the bottom of the lower case, the buffering member having an insertion hole into which an upper portion of the battery pack is inserted; and
a cover to cover the one surface of the lower case;
wherein the buffering member includes:
a frame to cover a circumference of the battery pack; and
n wing-shaped ribs protruding away from the frame to support an inside of the lower case, and wherein n is an integer equal to or greater than 2, and wherein at least one of the ribs of the buffering member has a hollow structure, and has a skeleton unit which supports a load of the battery pack in the hollow structure, the skeleton unit including:
 a first skeleton part oriented in a first direction; and
 a second skeleton part oriented in a second direction perpendicular to the first skeleton part and crossing the first skeleton part.

* * * * *